(12) United States Patent
Smith

(10) Patent No.: US 8,920,906 B2
(45) Date of Patent: Dec. 30, 2014

(54) MOLDED PULL-OFF TAB

(75) Inventor: Ronald M. Smith, Frankfort, IL (US)

(73) Assignee: Illinois Tool Works Inc., Glenview, IL (US)

(*) Notice: Subject to any disclaimer, the term of this patent is extended or adjusted under 35 U.S.C. 154(b) by 313 days.

(21) Appl. No.: 13/264,091

(22) PCT Filed: Mar. 22, 2010

(86) PCT No.: PCT/US2010/028094
§ 371 (c)(1),
(2), (4) Date: Oct. 12, 2011

(87) PCT Pub. No.: WO2010/120434
PCT Pub. Date: Oct. 21, 2010

(65) Prior Publication Data
US 2012/0025417 A1 Feb. 2, 2012

Related U.S. Application Data

(60) Provisional application No. 61/168,723, filed on Apr. 13, 2009.

(51) Int. Cl.
*B29C 33/12* (2006.01)
*B29C 45/14* (2006.01)

(52) U.S. Cl.
CPC ..... *B29C 45/14639* (2013.01); *B29C 45/14008* (2013.01); *B29C 45/14467* (2013.01)

USPC .......................... 428/156; 425/123; 264/261

(58) Field of Classification Search
CPC .............. B29C 45/14; B29C 45/14008; B29C 45/14063; B29C 45/14073; B29C 45/14196; B29C 45/14639; B29C 45/14467; B29C 45/1747; B29C 45/1748; B29C 45/1771; B29C 45/1866; B29C 45/2606; B29C 45/2673; B29C 45/32
USPC .......................... 428/156; 425/123; 264/261
See application file for complete search history.

(56) References Cited

U.S. PATENT DOCUMENTS

| 3,182,280 A * | 5/1965 | Daut et al. ................... 439/378 |
| 3,617,876 A * | 11/1971 | Robinson ..................... 324/538 |
| 5,616,053 A | 4/1997 | Bogursky et al. |
| 5,725,392 A | 3/1998 | Bianca et al. |
| 6,045,739 A | 4/2000 | Abe |
| 6,294,851 B1 | 9/2001 | Matsuyama et al. |
| 6,615,983 B1 * | 9/2003 | Yu ................................. 206/372 |

FOREIGN PATENT DOCUMENTS

JP 6297464 A 10/1994

OTHER PUBLICATIONS

ISR for PCT/US2010/028094 dated Jun. 7, 2010.

* cited by examiner

*Primary Examiner* — Maria Veronica Ewald
*Assistant Examiner* — Nancy Johnson

(57) ABSTRACT

A removable molding tab facilitates loading component parts into a mold by providing a body with holding configurations suitable to releasably secure the component parts in mold ready positions. The component parts are loaded into a mold as a preassembly with the removable tab. The tab is removed after the component parts are placed into the mold.

19 Claims, 5 Drawing Sheets

MOLDED PULL-OFF TAB

CROSS-REFERENCE TO RELATED APPLICATIONS

The present application is national phase of PCT/US2010/028094 filed Mar. 22, 2010, and claims the benefits of U.S. Provisional Application Ser. No. 61/168,723 filed Apr. 13, 2009.

FIELD OF THE INVENTION

The present invention relates generally to injection molding processes and apparatuses used therefore. More specifically, the present invention pertains to devices for preassembling or positioning components which are to be at least partly encapsulated by plastic in an injection molding process.

BACKGROUND OF THE INVENTION

Injection molding can be used to form parts that have complex shapes and features. It is known to use injection molding to encapsulate other parts or components, such as stamped metal conductors in the manufacture of electrical parts. A simple example is the common formation of a plastic plug head on the end of an electrical cord. Electrically conductive metal blades for the plug are electrically connected to wires. The blades are then positioned in a mold where plastic is injected to encapsulate an inner end portion of the blades as well as the blade-to-wire connection. The portions of the blades not to be encapsulated in plastic, the portions that are to remain exposed for electrical connection to another cord or to an electrical outlet, are inserted into narrow slots in the mold steel, the slots leaving insufficient space around the blades for the injected plastic to flow therein. More complex processes are used for more complex products, but the general process remains the same, with parts of components encapsulated in the injection molded plastic and other parts not encapsulated.

When molding plastic parts, it is desirable to maintain a specific cycle time, i.e. the time required to initiate the process for the part, mold the part and remove the part from the mold to start the next cycle. Desirably, the cycle time is sufficiently short to keep the plastic resin from degrading due to exposure to excessive heat in the molding machine injection unit, and to make the part in the allotted time.

It is known in the plastic injection molding industry that encapsulating a metal stamping that possesses multiple circuits creates a challenge if the multiple circuits must be handled and loaded into the mold by a human molding operator. It is desirable to load multiple circuits in a timely manner to maintain a specific cycle time. The more circuit components that must be loaded into a mold, the more time it takes to prepare the component parts before the actual step of injecting the plastic can be initiated. The same is true for any molding process in which multiple individual component parts have to be positioned in the mold before plastic injection can be initiated. Accordingly, it is desirable to shorten the time it takes for a mold operator to load metal stampings with multiple circuits, or other individual component parts, so that mold use efficiency is optimized.

It is known to attach multiple circuits together as a one-piece stamping assembly that a molding operator can load into a mold as a single piece. A known way to attach multiple circuits is to connect them via a "tie-bar", which is a portion of the metal stamping which is left between two or more circuits during the stamping process. Several tie-bars can be used to hold multiple circuits together, effectively creating a one-piece stamping for handling purposes. After the plastic part is molded, the tie-bar or tie-bars must be removed, often using a trim die that cuts or stamps the tie-bar from its position between the circuits, thereby effectively separating the circuits both physically and electrically. The use of a trim die in this way creates an open hole through the part when the die is pushed through the part to remove the tie-bar connection. A trimming operation adds additional cost to the part due to the additional handling after molding, and also requires the part to be designed in such a way as to have access to any tie-bars from both sides of the molded part for the trimming operation. In some part designs, it is difficult, if not impossible, to have the space required for tie-bars; or it may not be acceptable or desirable to have an open hole through the finished part. Some plastic parts must be sealed from one side of the part to the other side of the part, and having an open hole through the part must be avoided.

SUMMARY OF THE INVENTION

The present invention provides a removable holder for a temporary assembly that allows handling of multiple circuits, or multiple stamped or other individual component parts as one piece to maintain the desired mold operation cycle time; while also eliminating the need for the molded part to go through a post-molding trimming operation to remove tie-bars or other physical connectors between the component parts.

In one aspect of one form of a molded pull-off tab to be preassembled to multiple individual component parts to be loaded in an injection mold, the tab is provided with a body having a plurality of component receiving and holding formations, each of the formations being configured for holding one of the component parts. The formations are positioned in the body to hold the component parts in mold ready positions for direct loading into a mold. The formations are configured to readily release the component parts positioned in the mold and to be removed therefrom prior to molding.

In another aspect of a form of a molded pull-off tab, a body of the tab has a plurality of component receiving and holding formations each configured for holding an end of an electrical conductor. The formations are positioned in the body to hold the electrical conductors in mold ready positions for direct loading into a mold, and the formations are configured to be removed from the electrical conductors when the conductors are positioned in a mold part.

In still another aspect, a method for loading a mold with components to be at least partly encased in plastic has steps of obtaining the components; preassembling the components in a removable tab in mold ready positions to establish a temporary assembly of the tab and the components; placing the temporary assembly in a mold part; removing the removable tab from the temporary assembly in the mold part; and closing the mold with the components therein and with the tab removed.

Advantages of forms of the invention are that multiple component parts can be prearranged and secured as a single, temporary assembly suitable for placement in a mold, and thereafter separated before injection molding occurs, so that at completion of the molding cycle the individuality of the component parts is present. This can be achieved whether the molding process is for a single part having multiple discrete components encapsulated in a single molded body, or for creating several discrete molded parts in a single mold during the process Other features and advantages of the invention will become apparent to those skilled in the art upon review of the following detailed description, claims and drawings in which like numerals are used to designate like features.

Figure 1:
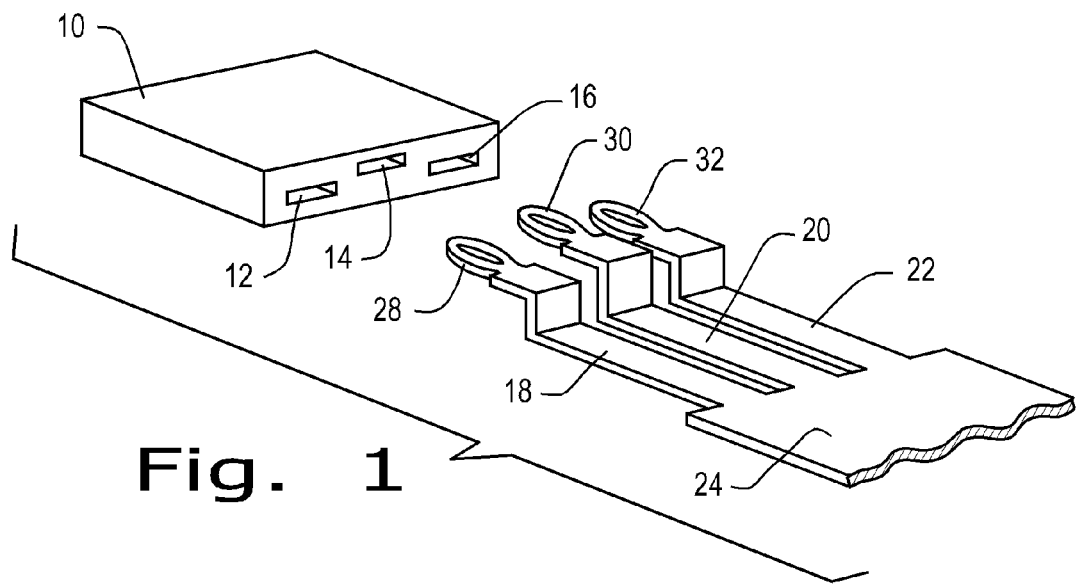
FIG. 1 is a perspective view of a step in an exemplary process for installing a pull-off tab on electrical conductors.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a molded pull-off tab 10 is shown. Pull-off tab 10 can be a molded or otherwise formed plastic body, a formed body of other material, or the like; and includes component receiving and holding formations 12, 14, 16 therein. In the exemplary embodiment shown in FIGS. 1-4, component receiving and holding formations 12, 14, 16 are pockets having openings along one side of pull-off tab 10, and pull-off tab 10 is essentially a rectangular block or body of monolithic material. However, it should be understood that pull-off tab 10 can be of other shapes as well.

Electrical conductors 18, 20, 22 are received in component receiving and holding formations 12, 14, 16, respectively. Each electrical conductor 18, 20, 22 is securely held in the respective receiving and holding formation 12, 14, 16 for transportation, handling and loading into a suitable mold wherein plastic will be injected for encapsulating an exposed portion of the conductors. Each individual component, such as electrical conductors 18, 20, 22 of the exemplary embodiment, is held by the pull-off tab in a mold ready position with respect to the other components so that the components can be loaded into a mold as a single temporary assembly, with little or no individual manipulation of the individual components. Portions of the conductors not held in the molded pull-off tab 10 can be positioned in parts of the mold either to be shielded from the injected molded plastic or to be encapsulated thereby. Molded pull-off tab 10 of the exemplary embodiment receives and holds portions of conductors 18, 20, 22 that are subsequently received in the mold steel and are not exposed in the open mold part, to be encapsulated in injected plastic. However, it should be understood that pull-off tabs for other uses might receive and hold portions of items to be exposed in the mold cavity and to be encased in plastic.

Figure 2:
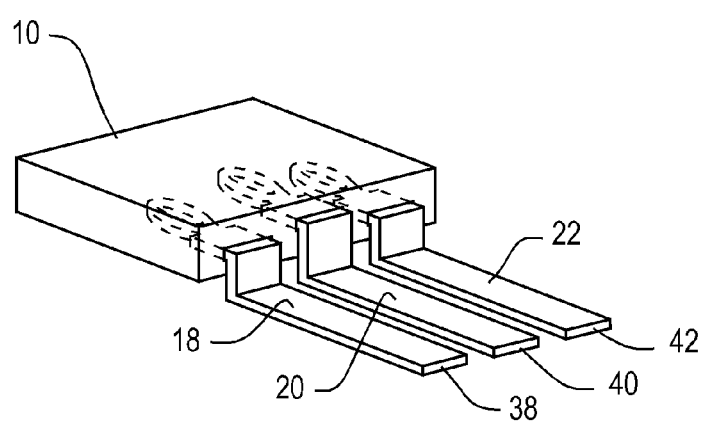
FIG. 2 is a perspective view of a temporary assembly using the pull-off tab and electrical conductors shown in FIG. 1.

Molded pull-off tab 10 can be assembled onto conductors 18, 20, 22 as a step during the stamping or other process used to form the conductors. Automatic, mechanical assembly or hand assembly of molded pull-off tab 10 to multiple component parts such as conductors 18, 20, 22 can be accomplished quickly and efficiently. Assembly of molded pull-off tab 10 onto conductors 18, 20, 22 may be performed before the conductors are fully separated one from another and with the conductors in the final position and orientation required for the subsequent molding operation. FIG. 1 shows a step in a stamping process in which conductors 18, 20, 22 are formed but not yet separated from a supply strip 24 of the material from which conductors 18, 20 and 22 are formed. Conductors 18, 20, 22 include terminal ends 28, 30, 32, respectively, that are received in holding formations 12, 14, 16 respectively. After pull-off tab 10 is connected to the conductors, the conductors can be separated one from another and from the supply strip 24 to form conductor ends 38, 40, 42 opposite from terminal ends 28, 30, 32, as shown in FIG. 2. Thereafter, the multiple component parts such as conductors 18, 20, 22 can be handled as a single assembly, securely held by molded pull-off tab 10; however, each conductor 18, 20, 22 is a separate and discrete component.

In another assembly process, individual electrical conductors can be inserted into molded pull-off tab 10 after complete formation and separation from the supply strip. Manual or mechanical assembly can be used.

In preferred embodiments of pull-off tabs, the spacing between individual component receiving and holding formations is such as to secure the electrical conductors in mold ready positions for efficient loading into a mold.

The temporary assembly of molded pull-off tab 10 on conductors 18, 20, 22 can be handled for shipping and loading into a mold as a single unit. Once the component parts such as conductors 18, 20, 22 have been at least partially positioned in the mold, pull-off tab 10 is removed by pulling, twisting or the like, and molding proceeds in a standard, known manner. The finished parts are formed with conductors 18, 20, 22 fully separated as required. Handling of the multiple conductors as a single assembly via pull-off tab 10 reduces the time and manipulation required from the molding operator. The assembly of multiple components into an individual, removable holder, such as pull-off tab 10, can also facilitate mechanical handling or loading into a mold in an efficient, time-saving manner.

It should be understood that the molded pull-off tabs are specifically designed, shaped and configured for holding the particular component parts to be secured therein. Each pull-off tab can hold as many individual components as ergonomically advantageous for either manual or mechanical handling, and as suitable for loading into a mold. The shape and configuration of pull-off tab 10 and the connection of the component parts thereto are such as to position the component parts in an advantageous relationships one with another for loading into the mold in which the part or parts will be completed. The pull-off tab can be positioned at an end of the component parts, or can be positioned at some intermediate position along the component parts, as desirable to facilitate loading the ganged component parts into a mold.

Figure 6:
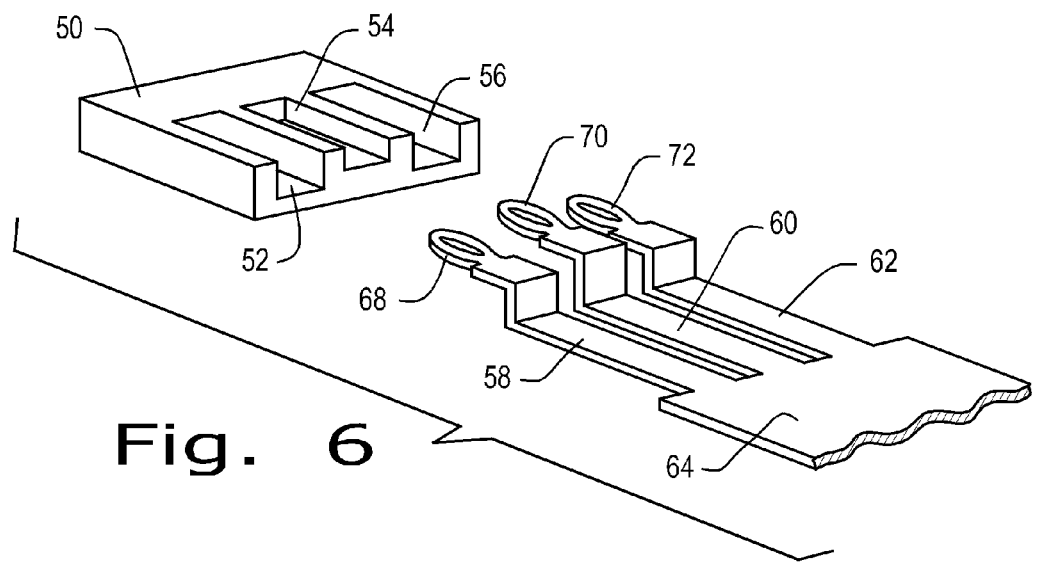
FIG. 6 is a perspective view of a step in an exemplary process for installing a pull-off tab of another embodiment on electrical conductors similar to those shown previously.
Figure 7:
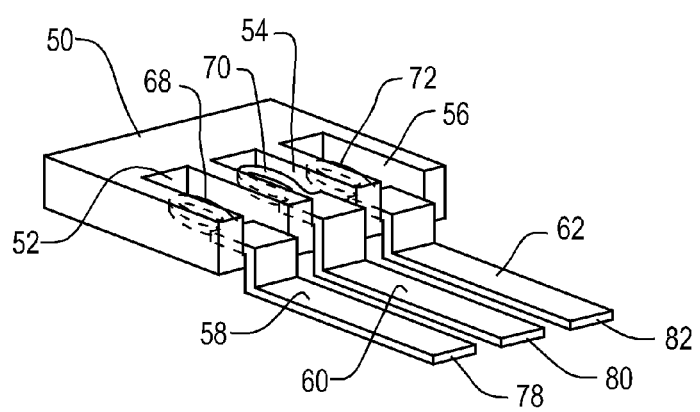
FIG. 7 is a perspective view of a temporary assembly using the pull-off tab and electrical conductors shown in FIG. 6.

FIG. 1 illustrates closed pockets for holding conductors 18, 20 and 22. However, open slots also can be used. FIG. 6 illustrates a pull-off tab 50 having component receiving and holding formations 52, 54, 56 therein in the nature of open slots. Electrical conductors 58, 60, 62 can be pushed into slots 52, 54, 56, either mechanically or manually, so that the temporary assembly of pull-off tab 50 and conductors 58, 60, 62 held thereby can be handled as one assembly. As with the previous embodiment, electrical conductors 58, 60, 62 can be formed from a supply strip 64, and terminal ends 68, 70, 72 of electrical conductors 58, 60, 62 can be inserted into slots 52, 54, 56 either through open ends of the slots or from the top openings to the slots before the individual conductors are separated from the supply strip. Alternatively, individual conductors can be attached to the pull-off tab after separation from the supply strip by manual or mechanical processes.

It should be understood that still other shapes, sizes and configurations for a molded pull-off tab can be used for many different types of component parts, including component parts other than the electrical conductors illustrated. The particular shapes, sizes, configurations and numbers of parts and formations are merely exemplary in nature and should not in any way be considered limiting on the principles and features. While the exemplary embodiments show pull off tabs for holding individual components used to make a single part, a pull off tab also can be used to hold individual components when multiple parts are formed in a single mold. While one temporary assembly of a pull-off tab and electrical conductors is shown, it should be understood that multiple temporary assemblies including several pull-off tabs and component parts held therein can be used in a single mold, either to position multiple components in a complex structure or to provide components for molding multiple individual parts in a single molding process. Accordingly, the component parts held by one pull-off tab can be the same as or different from the component parts held by other pull-off tabs, and a single pull-off tab can hold different types of component parts.

Figure 3:
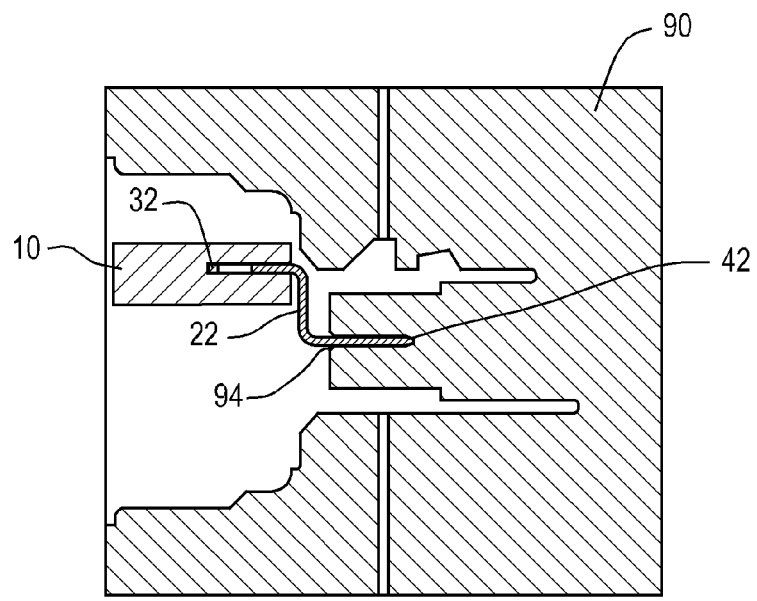
FIG. 3 a cross-sectional view of the temporary assembly installed in a mold part for making a connector using the conductors.
Figure 4:
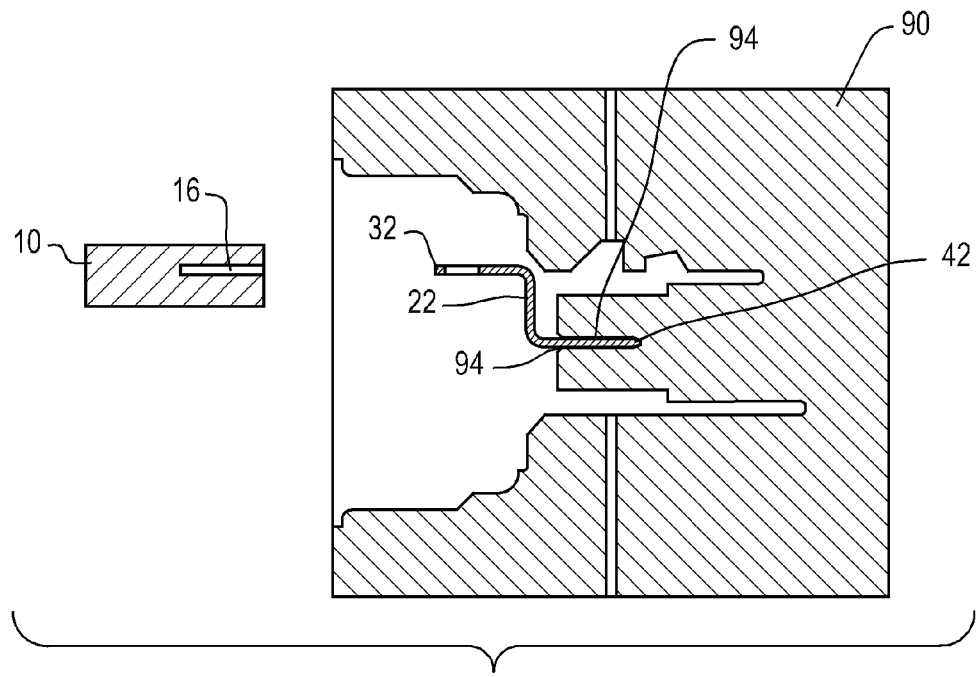
FIG. 4 a cross-sectional view of the conductors positioned in the mold and the pull-off tab removed.
Figure 5:
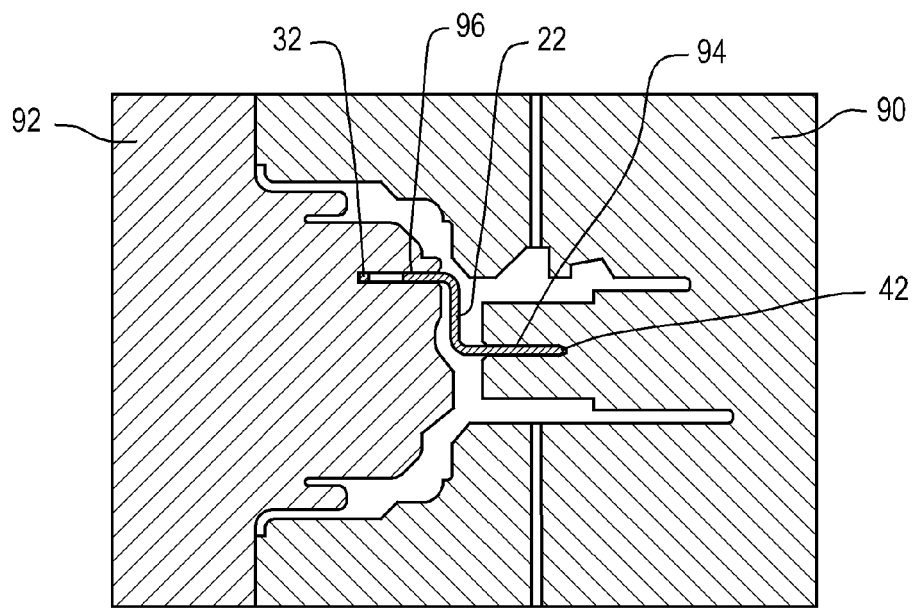
FIG. 5 a cross-sectional view of the conductors and mold in closed and final positions for molding the connector.
Figure 5A:
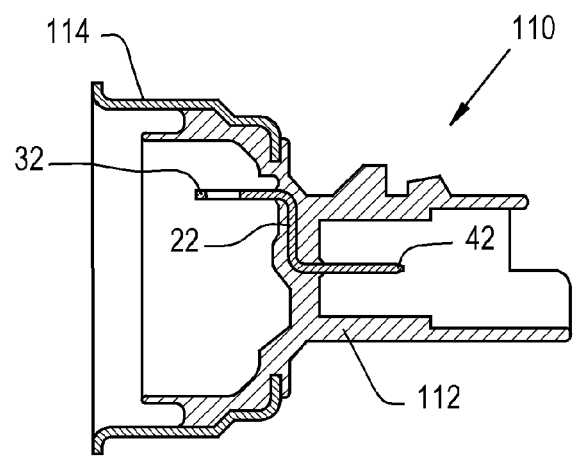
FIG. 5A cross-sectional view of the finished molded connector.

As shown in FIGS. 3-5, the temporary assembly of molded pull-off tab 10 and the electrical conductors 18, 20, 22 can be loaded into a first mold part 90, with molded pull-off tab 10 then removed before the mold is closed by engaging a second mold part 92. The temporary assembly of molded pull-off tab 10 and electrical conductors 18, 20, 22 is manipulated so as to position conductor ends 38, 40, 42 into slots 94 of first mold part 90, which may have a separate slot 94 for each conductor end 38, 40, 42. Molded pull-off tab 10 is removed by pulling laterally. Thereafter, second mold part 92 is positioned with slots 96 thereof receiving terminal ends 28, 30, 32 of the conductors. Standard molding procedures can be followed, including any necessary overmolding, so as to form a completed electrical connector 110 having molded portions 112, 114 surrounding the electrical conductors 18, 20, 22.

Figure 8:
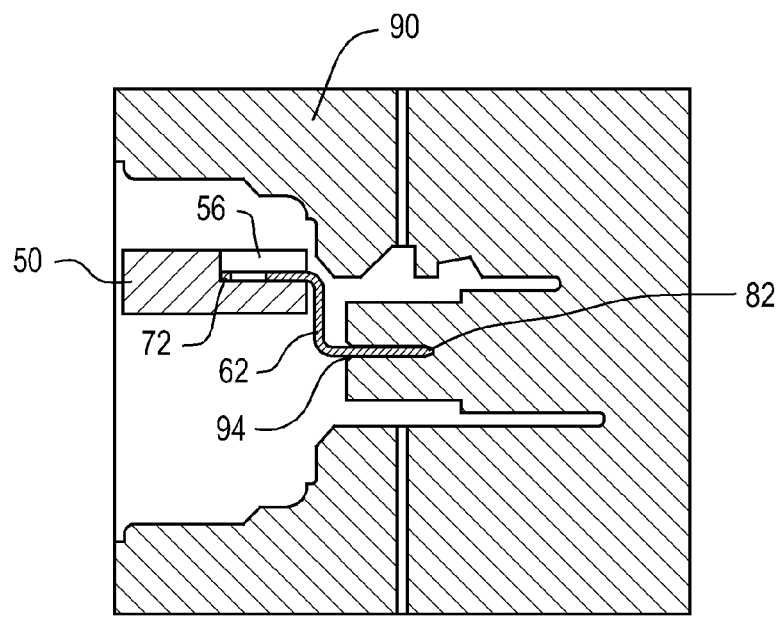
FIG. 8 a cross-sectional view of the temporary assembly installed in a mold for making a connector using the conductors, which can be the same mold shown previously.
Figure 9:
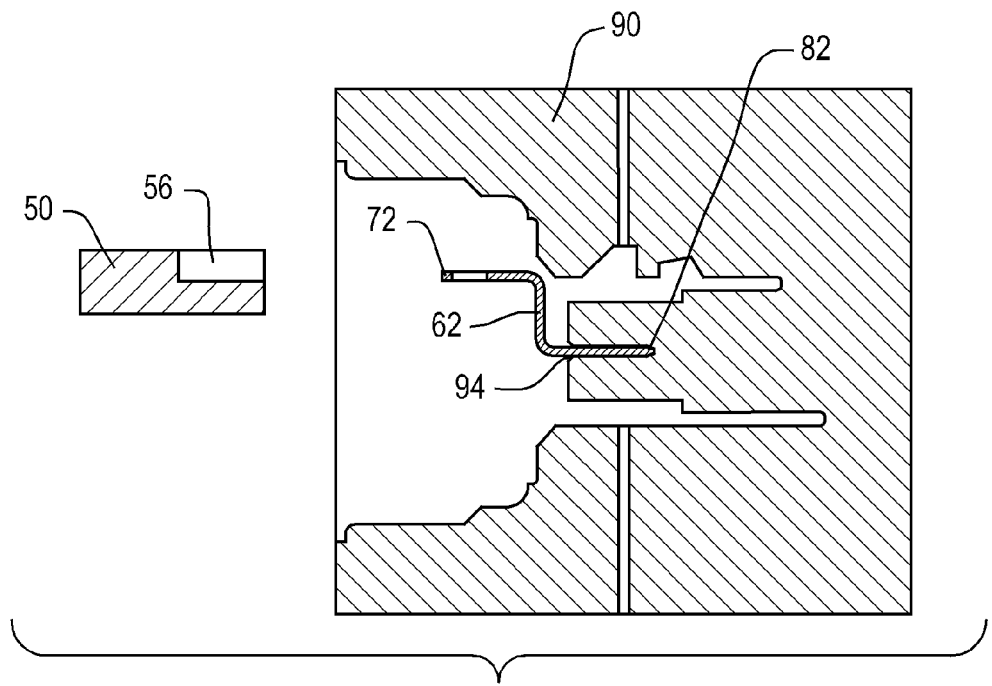
FIG. 9 a cross-sectional view of the conductors positioned in the mold and the pull-off tab of FIG. 8 removed.

As shown in FIGS. 8 & 9, a temporary assembly of molded pull-off tab 50 and the electrical conductors 58, 60, 62 can be used in the same mold having mold parts 90, 92. First mold part 90 is provided with a slot 94 for each conductor end. The conductor ends 78, 80, 82 are inserted into the slots, and tab 50 is then removed by pulling or twisting relative to the conductors so that terminal ends 68, 70, 72 are released from component receiving and holding formations slots 52, 54, 56. The mold is closed and a similar electrical connector can be formed.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A molded pull-off tab system providing a molded pull off tab to be preassembled to multiple individual component parts to be loaded in an injection mold, the molded pull-off tab system comprising:
   multiple component parts each comprising a strip of extenuate electrical conductor having first and second opposite ends;
   an injection mold comprising at least two mold portions inter-fitting to define a substantially closed mold cavity adapted to receive injected plastic for the molding of a part, a first mold portion providing slots for receiving the first ends to locate the multiple component parts with respect to the first mold portion and a second mold portion receiving the second ends when the injection mold is closed to stably retain the multiple component parts within the closed mold cavity;
   a pull off tab having a unitary body of plastic having a plurality of component receiving and holding formations, each of said formations being configured for releasably holding the second ends of the component parts as received along an insertion axis, the formations providing a wall extending across the insertion axis and limiting a depth of insertion of the component parts by abutment of the wall and a portion of the component parts;
   said formations positioned in said body so as to hold the component parts in mold ready positions for direct loading of the first ends into the slots of the first mold portion with movement along the insertion axis; and
   said formations configured to readily release the component parts positioned in the mold and to be removed therefrom prior to molding.

2. The pull-off tab of claim 1, at least some of said formations being pockets in the body.

3. The pull-off tab of claim 1, at least some of said formations being slots having top openings extending along the insertion axis.

4. The pull-off tab of claim 3, at least some of said slots having open ends extending across the insertion axis.

5. The pull-off tab of claim 1, at least some of said formations being configured to hold electrical conductors for an electrical connector.

6. The pull-off tab of claim 1, said formations configured for holding multiple component parts of a single structure after molding.

7. The pull-off tab of claim 1, said body being molded.

8. The pull-off tab of claim 1, said formations configured for holding ends of the component parts.

9. A molded pull-off tab system providing a molded pull off tab to be preassembled to multiple individual component parts to be loaded in an injection mold, the molded pull-off tab comprising:

multiple component parts each comprising a strip of extenuate electrical conductor having first and second opposite ends;

an injection mold comprising at least two mold portions inter-fitting to define a substantially closed mold cavity adapted to receive injected plastic for the molding of a part, a first mold portion providing slots for receiving the first ends to locate the multiple component parts with respect to the first mold portion and a second mold portion receiving the second ends when the injection mold is closed to stably retain the multiple component parts within the closed mold cavity;

a pull off tab having a unitary body of plastic having a plurality of component receiving and holding formations, each of said formations being configured for releasably holding second ends of the component parts as received along an insertion axis, the formations providing a wall extending across the insertion axis and limiting a depth of insertion of the component parts by abutment of the wall and a portion of the component parts;

said formations positioned in said body so as to hold the electrical conductors in mold ready positions for direct loading of the first ends into the slots of the first mold portion with movement along the insertion axis; and said formations configured to be removed from the electrical conductors when the conductors are positioned in a mold part.

10. The pull-off tab of claim 9, at least some of said formations being pockets in the body.

11. The pull-off tab of claim 9, at least some of said formations being slots having top openings extending along the insertion axis.

12. The pull-off tab of claim 11, at least some of said slots having open ends extending across the insertion axis.

13. The pull-off tab of claim 9, said formations provided for holding all electrical conductors of a single electrical connector.

14. The pull-off tab of claim 9, said body being molded.

15. The pull-off tab of claim 9, said body being plastic.

16. The pull-off tab of claim 1, said formations configured for holding ends of the electrical conductors.

17. A method for loading a mold with components to be at least partly encased in plastic, said method employing a molded pull-off tab system providing:

multiple component parts each comprising a strip of extenuate electrical conductor having first and second opposite ends;

an injection mold comprising at least two mold portions inter-fitting to define a substantially closed mold cavity adapted to receive injected plastic for the molding of a part, a first mold portion providing slots for receiving the first ends to locate the multiple component parts with respect to the first mold portion and a second mold portion receiving the second ends when the injection mold is closed to stably retain the multiple component parts within the closed mold cavity;

a pull off tab having a unitary body of plastic having a plurality of component receiving and holding formations, each of said formations being configured for releasably holding the second ends of the component parts as received along an insertion axis, the formations providing a wall extending across the insertion axis and limiting a depth of insertion of the component parts by abutment of the wall and a portion of the component parts;

said formations positioned in said body so as to hold the component parts in mold ready positions for direct loading of the first ends into the slots of the first mold portion with movement along the insertion axis; and said formations configured to readily release the component parts positioned in the mold and to be removed therefrom prior to molding;

said method comprising steps of;

obtaining the components;

preassembling the components in a unitary removable tab in mold ready positions to establish a temporary assembly of the tab and the components, the removable tab receiving the components along insertion axes and providing walls extending across the insertion axis and limiting a depth of insertion of the component parts by abutment of the wall and a portion of the component parts, the preassembling aligning the components by abutment of the components against the walls;

placing the temporary assembly in a mold part;

removing the removable tab from the temporary assembly in the mold part while leaving the components in the mold apart from the removable tab; and closing the mold with the components therein and with the tab removed.

18. The method of claim 17, the step of removing the removable tab including pulling the tab from ends of the components.

19. The method of claim 17, said step of removing the removable tab including enacting relative twisting movement between the tab and the components.

* * * * *